(12) United States Patent
Nieminen

(10) Patent No.: US 8,177,071 B2
(45) Date of Patent: May 15, 2012

(54) INJECTOR FOR FLOTATION CELL

(75) Inventor: Erkka Nieminen, Tampere (FI)

(73) Assignee: Metso Paper, Inc. (FI)

( * ) Notice: Subject to any disclaimer, the term of this patent is extended or adjusted under 35 U.S.C. 154(b) by 154 days.

(21) Appl. No.: 12/594,036

(22) PCT Filed: Apr. 3, 2008

(86) PCT No.: PCT/FI2008/050163
§ 371 (c)(1),
(2), (4) Date: Jan. 14, 2010

(87) PCT Pub. No.: WO2008/122692
PCT Pub. Date: Oct. 16, 2008

(65) Prior Publication Data
US 2010/0108614 A1    May 6, 2010

(30) Foreign Application Priority Data
Apr. 5, 2007   (FI) ..................... 20075237

(51) Int. Cl.
*B03D 1/24* (2006.01)
*B03D 1/14* (2006.01)
*B01F 3/04* (2006.01)

(52) U.S. Cl. .................. 209/170; 162/4; 261/76
(58) Field of Classification Search ............. 209/170; 162/4; 261/76
See application file for complete search history.

(56) References Cited

U.S. PATENT DOCUMENTS

| | | | |
|---|---|---|---|
| 4,251,361 A | | 2/1981 | Grimsley |
| 4,477,341 A | * | 10/1984 | Schweiss et al. ............. 209/170 |
| 5,465,848 A | | 11/1995 | Veh et al. |
| 6,126,836 A | | 10/2000 | Ding et al. |

FOREIGN PATENT DOCUMENTS

| | | | |
|---|---|---|---|
| AU | 9873124 A | * | 12/1998 |
| AU | 2002101010 | * | 5/2003 |
| DE | 3223170 A | * | 12/1983 |
| FI | 113748 B | | 6/2004 |
| GB | 2 130 920 A | | 6/1984 |
| WO | WO 2006/134235 A1 | * | 12/2006 |

OTHER PUBLICATIONS

Office Action and Search Report dated Nov. 23, 2007 issued in connection with Finnish Priority Appl. No. 20075237 filed Apr. 5, 2007.
International Search Report issued in connection with International Application No. PCT FI2008/050163 completed Mar. 9, 2009.

* cited by examiner

*Primary Examiner* — Thomas M Lithgow
(74) *Attorney, Agent, or Firm* — Alston & Bird, LLP

(57) ABSTRACT

An injector for a flotation cell, comprising a feed channel for feeding a fiber suspension flow to the flotation cell, a flow distribution element for distributing the fiber suspension flow fed to the injector into partial flows, a mixing apparatus for mixing air with the fiber suspension flow, and at least one air input point for sucking air to be mixed with the fiber suspension flow into the injector. The feed channel, the flow distribution element and the mixing apparatus are in the injector arranged with respect to one another such that a flow direction of the fiber suspension flow in the feed channel is substantially opposite to a flow direction of the fiber suspension flow through the flow distribution element and the mixing apparatus.

12 Claims, 6 Drawing Sheets

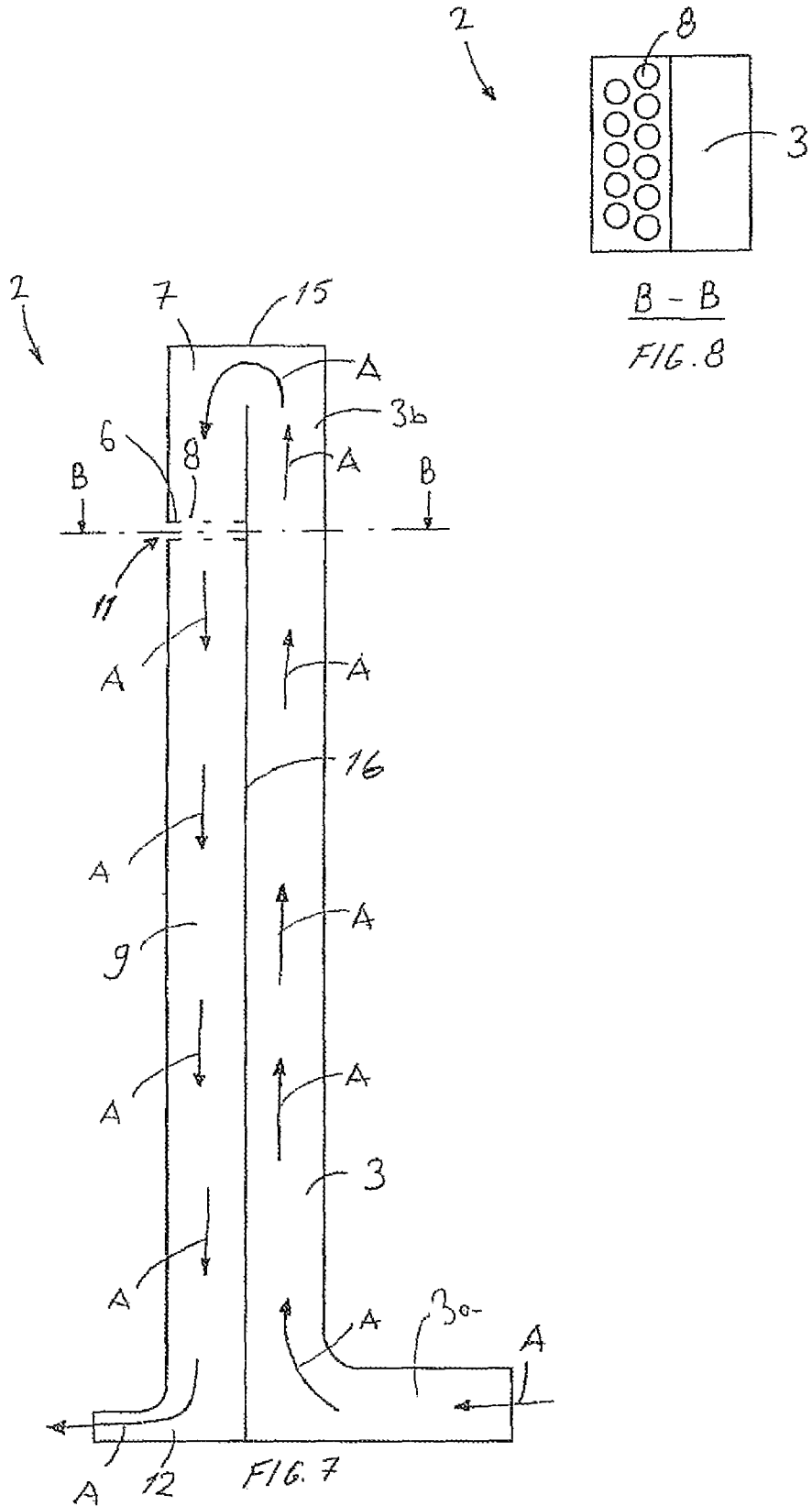

INJECTOR FOR FLOTATION CELL

BACKGROUND OF THE INVENTION

1. Field of the Invention

The invention relates to an injector for a flotation cell, comprising a feed channel for feeding a fibre suspension flow to the flotation cell, a flow distribution element for distributing the fibre suspension flow fed to the injector into partial flows, a mixing apparatus for mixing air with the fibre suspension, and at least one air input point for sucking air to be mixed with the fibre suspension into the injector.

The invention further relates to a flotation cell for removing ink or impurities from a fibre suspension.

The invention still further relates to a method of feeding a fibre suspension flow to a flotation cell comprising an injector comprising a feed channel for feeding the fibre suspension flow to the flotation cell, a flow distribution element for distributing the fibre suspension flow fed to the injector into partial flows, a mixing apparatus for mixing air with the fibre suspension, and at least one air input point for sucking air to be mixed with the fibre suspension into the injector, the method comprising feeding the fibre suspension flow to the injector, distributing the fibre suspension flow to be fed to the injector into partial flows so that the partial flows suck air to be mixed with the fibre suspension flow into the injector, feeding the partial flows of the fibre suspension flow to a mixing apparatus constituting a pre-mixing phase, whereby the partial flows carry the air sucked into the injector by the partial flows to the pre-mixing phase, and mixing in the pre-mixing phase the air carried by the partial flows to the pre-mixing phase with the partial flows.

2. Description of Related Art

Flotation cells, i.e. flotation containers, are used for removing ink and other impurities from a fibre suspension produced from disintegrated and sorted recycled paper. This process is also called deinking. The purpose of deinking is to obtain as white and clean recycled fibre pulp as possible. Flotation cells are used in flotation deinking, where flotation is performed in cells by adding, as a flotation chemical, soap or another flotation stimulating and surface tension preventing chemical to a diluted, approximately 1-% fibre suspension. In addition, air is mixed with the fibre suspension. Ink and other impurities adhere to air bubbles that rise to the surface of the fibre suspension, enabling the ink and other impurities to be removed from the surface of the fibre suspension by using overflow or scraping.

U.S. Pat. No. 5,465,848 discloses a typical flotation cell which includes an injector provided with a feed channel for introducing a fibre suspension to be purified to the flotation cell. In addition to the feed channel, the injector comprises an aperture plate which serves as a flow distribution element for dividing the fibre suspension flow to be fed to the flotation cell into smaller partial flows. Downstream of the aperture plate and at a distance therefrom, tube sections are provided which form a mixing apparatus and in which partial flows of the fibre suspension flow emerging through the apertures of the aperture plate and air to be fed to the injector are pre-mixed with one another. Air is fed to the injector via an air intake point arranged between the aperture plate and the tube sections on the side of the injector so that the air to be fed to the injector is carried by the partial flows to the mixing apparatus constituting a premixing phase.

A problem with flotation cells and injectors in particular of the kind disclosed in U.S. Pat. No. 5,465,848 is that the injector difficult to clean since it lacks unobstructed access to the aperture plate of the injector and the tube sections constituting the mixing apparatus for their washing and flushing without dismantling the entire injector. In addition, a feed pipe extending high above the roof of the flotation cell and manifold pipes to be placed therefore at least partly high above the roof of the flotation cell for conveying the fibre suspension from the pulp processing devices to the flotation cells take a considerable structural space, which increases the total height of the flotation cell system and thus the need for space in the vertical direction so that in the case of two superimposed flotation cells, for instance, the need for space is doubled.

BRIEF SUMMARY OF THE INVENTION

An object of the present invention is to provide a novel and improved injector.

An injector according to the invention is characterized in that the feed channel, the flow distribution element and the mixing apparatus are in the injector arranged with respect to one another such that a flow direction of the fibre suspension flow in the feed channel is substantially opposite to the flow direction of the fibre suspension flow through the flow distribution element and the mixing apparatus.

Furthermore, a flotation cell according to the invention is characterized in that the flotation cell comprises at least one injector according to claim 1.

Further, a method according to the invention is characterized by the feed channel, the flow distribution element and the mixing apparatus being in the injector arranged with respect to one another such that when the fibre suspension is fed to the injector, the fibre suspension flow flows in the feed channel in a direction substantially opposite to the flow direction of the fibre suspension flow through the flow distribution element and the mixing apparatus.

A flotation cell injector comprises a feed channel for feeding a fibre suspension flow to a flotation cell, a flow distribution element for distributing the fibre suspension flow fed to the injector into partial flows, a mixing apparatus for mixing air with the fibre suspension, and at least one air input point for sucking air to be mixed with the fibre suspension into the injector. Further, the feed channel, the flow distribution element and the mixing apparatus are in the injector arranged with respect to one another such that the flow direction of the fibre suspension flow in the feed channel is substantially opposite to the flow direction of the fibre suspension flow through the flow distribution element and the mixing apparatus.

According to an embodiment, the feed channel has a first end and a second end, and in connection with the second end of the feed channel a flow distribution chamber is arranged which is provided with a flow distribution element for distributing the fibre suspension flow fed to the flow distribution chamber into partial flows, and the fibre suspension is arranged to be fed to the injector via the first end of the feed channel, and the fibre suspension is arranged to flow from the feed channel to the flow distribution chamber via the second end of the feed channel such that when the fibre suspension flow flows from the feed channel to the flow distribution chamber, the flow direction of the fibre suspension flow is arranged to turn 180 degrees.

According to an embodiment, the flow distribution chamber, the flow distribution element and the mixing apparatus are each placed around the feed channel such that each of them contributes to surrounding the feed channel, and the feed channel, the flow distribution chamber, the flow distribution element and the mixing apparatus share a common central axis.

When the feed channel, the flow distribution element and the mixing apparatus of the injector are in the injector arranged with respect to one another such that the flow direction of the fibre suspension flow in the feed channel is substantially opposite to the flow direction of the fibre suspension flow through the flow distribution element and the mixing apparatus, a lower structure of the injector is achieved. This, in turn, results in a smaller total height of flotation cell structures since owing to a design typical of the flotation cells, a system of manifold pipes may be placed such that in a vertical direction of the flotation cell it does not exceed the boundary dimensions of a typical flotation cell. The mixing apparatus, however, may simultaneously be made sufficiently long so as to enable the partial flows of the fibre suspension flows and air to be mixed with one another efficiently already in the mixing apparatus. When the flow distribution chamber, the flow distribution element and the mixing apparatus are arranged around the feed channel such that each of them contributes to surrounding the feed channel, an extremely compact injector structure is provided wherein the flow of the fibre suspension can be implemented in a highly uniform and controlled manner.

BRIEF DESCRIPTION OF THE FIGURES

Some embodiments of the invention are described in closer detail in the accompanying drawings, in which FIG. 7 is a schematic, cross-sectional side view of the injector according to FIG. 6, and FIG. 8 schematically shows the cross section of the injector according to FIGS. 6 and 7 taken along cross-sectional line B-B of FIG. 7.

For the sake of clarity, the figures show some embodiments of the invention in a simplified manner. Like reference numerals identify like elements.

DETAILED DESCRIPTION OF SOME EMBODIMENTS OF THE INVENTION

Figure 1:
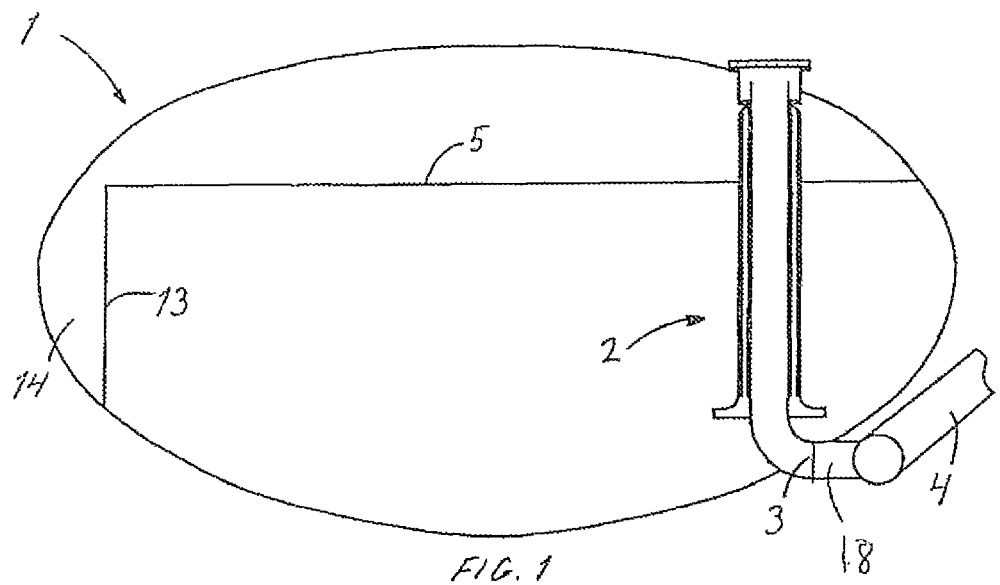
FIG. 1 is a schematic, cross-sectional side view of a flotation cell.
Figure 2:
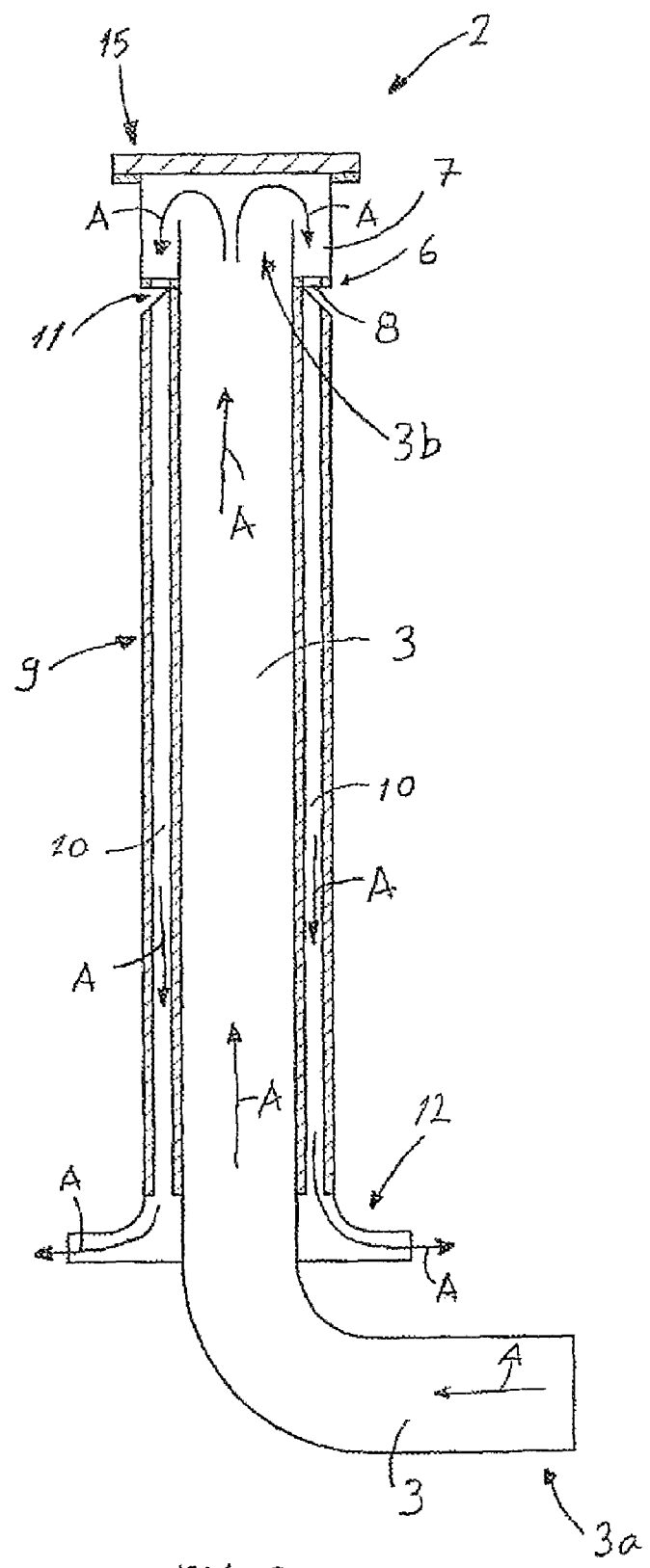
FIG. 2 is a schematic, cross-sectional side view of an injector.

FIG. 1 is a schematic, cross-sectional side view of a flotation cell 1 for removing ink and other impurities from a fibre suspension. The flotation cell 1 includes an injector 2 provided with a feed channel 3 for feeding the fibre suspension and a flotation chemical added thereto, such as soap, to the flotation cell 1. FIG. 2 is a cross-sectional side view of an injector 2 in closer detail. Indicated by arrow A, FIG. 2 also shows the flow direction of a fibre suspension fed to the flotation cell 1 from preceding pulp processing devices via a system of manifold pipes, one such manifold pipe 4 being shown in FIG. 1, via the injector 2 to the flotation cell 1.

Pulp may be fed at any point of the manifold pipe 4 along the length of the mixing apparatus. From the manifold pipe 4 the fibre suspension flows via a feed pipe 18 to the feed channel 3 of the injector 2.

The injector 2 is placed with respect to a surface 5 of the fibre suspension in the flotation cell 1 such that the lower part of the injector 2 extends below the surface 5 of the fibre suspension. The injector 2 further comprises a flow distribution element 6 arranged at the bottom of a flow distribution chamber 7 located in the upper part of the injector 2. Apertures 8 in the flow distribution element 6 distribute the fibre suspension flow coming via the feed channel 3 into partial flows which, as seen in the flow direction of the fibre suspension, are forwarded to a mixing apparatus 9 situated downstream of the flow distribution element 6. The mixing apparatus 9 according to FIGS. 1 to 4 consists of tube sections 10 which are separated from one another by partitions 17 and which receive the partial flows of the fibre suspension flow coming from the apertures 8 of the flow distribution element 6. While the partial flows of the fibre suspension flow flow from the apertures 8 of the flow distribution element 6 to the mixing apparatus 9, these partial flows suck air from air input points 11 situated downstream of the flow distribution element 6 as seen in the flow direction of the fibre suspension and convey the air to the mixing apparatus 9. The purpose of the mixing apparatus 9 is to enhance the mixing together of fibre suspension and air by pre-mixing air with the partial flows of the fibre suspension flow. The mixing apparatus 9, the interior spaces of the tube sections 10 thereof forming a mixing space, thus constitutes a sort of pre-mixing phase for mixing the fibre suspension and air together. Of course, the fibre suspension and the air keep mixing together in the flotation cell 1 as well.

The lower part of the injector 2 may further be provided with a radial diffuser 12. The radial diffuser 12 enables the fibre suspension to be guided in a desired direction and to a desired spot in the flotation cell 1. The radial diffuser 12 is a nozzle which reverses the flow direction of the fibre suspension from vertical to horizontal. The flow may also be guided obliquely downwards, obliquely upwards or in different directions from different angle positions. The fibre suspension flows out of the radial diffuser 12 over the entire circumference of the diffuser or a part thereof. It is possible to adjust the amount of fibre suspension to be guided to different angles by changing the distance between a lower and an upper lip of the radial diffuser 12. On the other hand, a desired flow rate for the fibre suspension is provided by selecting the distance between the lower and the upper lip.

In the flotation cell 1, ink and other impurities adhere to bubbles formed by air and a flotation agent, which rise to the surface of the fibre suspension, wherefrom the ink and other impurities may be removed by using a scraper (not shown in FIG. 1) or overflow. The overflow mentioned in FIG. 1 is formed by means of a dam plate 13, in which case the foam generated on the surface of the fibre suspension and the ink and other impurities therein are transferred over the dam plate 13 to a reject space 14 and forwarded therefrom via a reject discharge channel (not shown in the figures) to further processing. The accept of the flotation cell is removed via an accept channel (not shown) to a next process phase. The basic structure and mode of operation of the flotation cell 1 are obvious to one skilled in the art, so they will not be discussed in closer detail herein.

Figure 3:
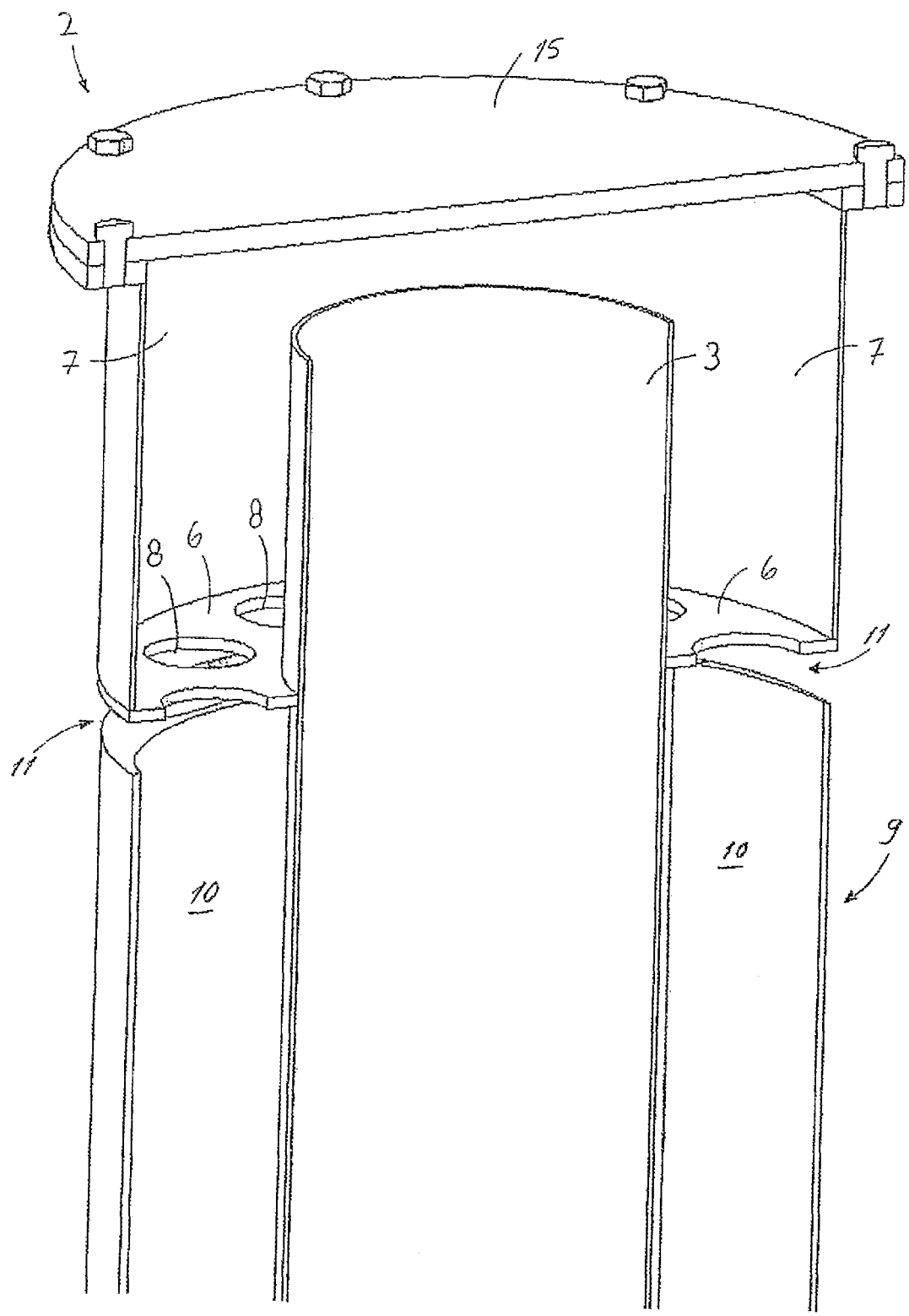
FIG. 3 is a schematic, cross-sectional view of an upper end of the injector according to FIG. 2 as viewed obliquely from above, FIG. 4 schematically shows a feed channel, a flow distribution element and a mixing apparatus of the injector according to FIG. 2 as viewed obliquely from below.
Figure 4:
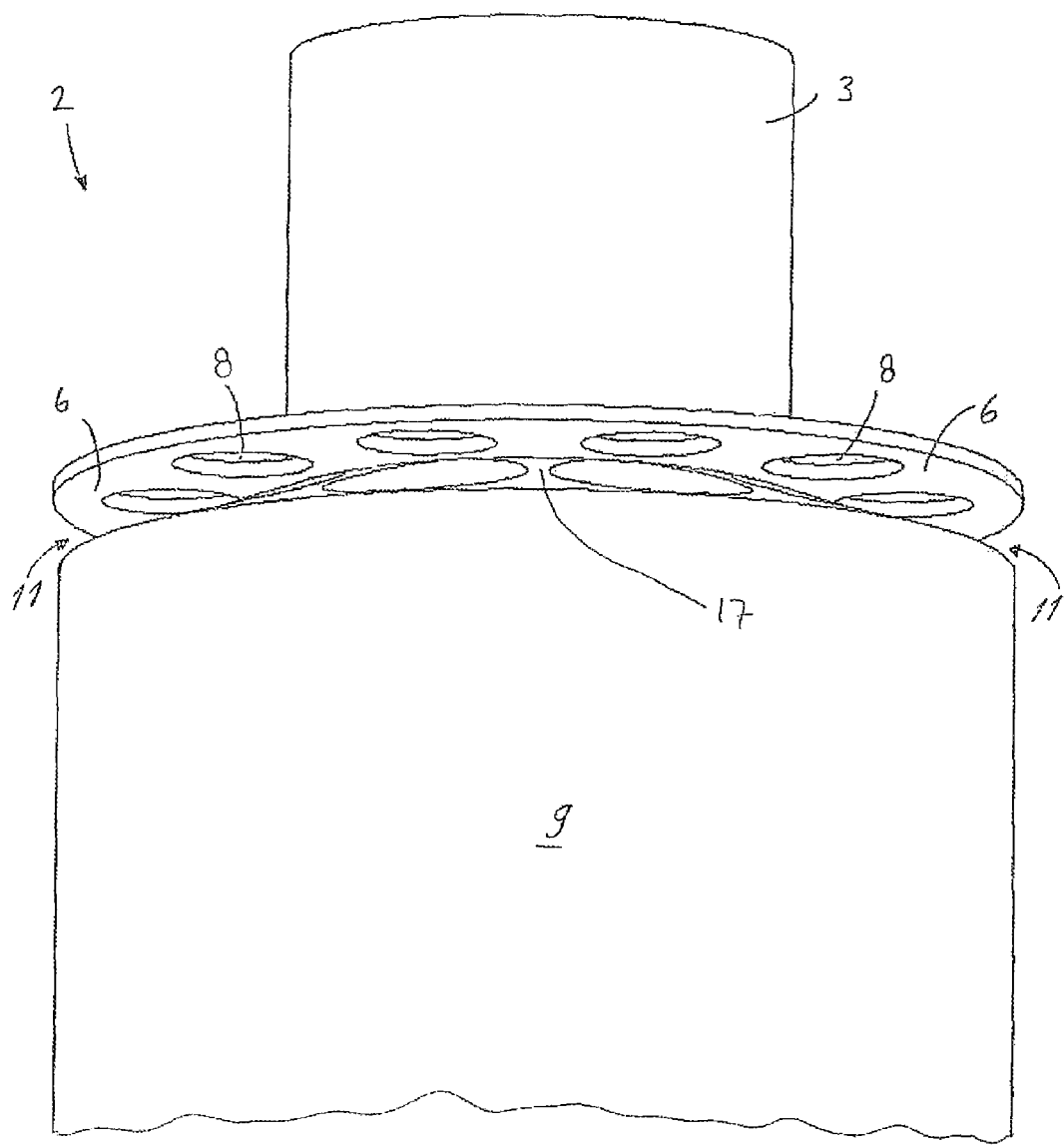

In the injector 2 according to FIGS. 2 to 4, the feed channel 3 is placed in the middle of the structure of the injector 2. The upper part of the feed channel 3 extends above the flow distribution element 6 when, as shown in FIGS. 2 to 4, the injector 2 is in an upright position. The flow distribution chamber 7 and the flow distribution element 6 at the bottom thereof and the mixing apparatus 9 situated downstream of the flow distribution element 6, in turn, are placed immediately around the feed channel 3 such that each of them contributes to surrounding the feed channel 3. The feed channel 3, the flow distribution chamber 7, the flow distribution element 6 and the mixing apparatus 9 thus share a common central axis. The disclosed structure enables the fibre suspension to be fed along the feed channel 3 via its first end 3a, i.e. the lower part of the injector 2, from downstream to upstream. The feed channel 3 located in the middle of the structure of the injector 2 guides the fibre suspension as indicated by arrows A to the flow distribution chamber 7 residing in the upper part of the injector 2, the fibre suspension making a 180 degree turn downwards when it moves from the feed channel 3 via its second end 3b to the flow distribution chamber 7. The flow distribution element 6 located at the bottom of the flow distribution chamber 7 distributes the fibre suspension flow into partial flows. The upper part of the injector 2, and at the same time the upper part of the flow distribution chamber 7, i.e. an end of the injector 2 towards which the second end 3b of the feed channel 3 is directed, is closed by means of a cover 15. When the cover 15 is attached to the injector 2 e.g. by a bolt-and-nut fastening means such that the cover 15 is detachable from the injector 2 by unfastening the bolt-and-nut fastening means, the cover 15 may be used as a cleaning door which enables easy cleaning and flushing of the feed channel 3, the flow distribution chamber 7, the flow distribution element 6 and the tube sections 10 of the mixing apparatus 9.

In the injector 2 shown in the figures, the fibre suspension may thus be fed along the feed channel 3 from the lower part of the injector 2 from downstream to upstream, but in the flow distribution chamber 7 and through the flow distribution element 6 and the mixing apparatus 9 the fibre suspension moves from upstream to downstream. In the disclosed injector 2, the fibre suspension thus flows in the feed channel 3 in a direction opposite to the flow direction of the fibre suspension in the flow distribution chamber 7 and through the apertures 8 of the flow distribution element 6 and the tube sections 10 of the mixing apparatus 9.

The fibre suspension may be fed along the feed pipe 18 also directly from downstream. In such a case, no angle fitting is necessary at the first end 3a of the feed channel 3 for reversing the direction of the flow. An angle fitting may also be provided at the end of the feed pipe 18, in which case the feed channel 3 of the injector 2 may begin at the diffuser 12.

The disclosed mutual arrangement of the feed channel 3, the flow distribution element 6 and the mixing apparatus 9 enables a compact and lower structure to be achieved for the injector 2, which thus further results in a smaller total height of the flotation cell 1 since owing to a typical design of the flotation cell 1, the manifold pipes 4 may be placed such that in the vertical direction of the flotation cell 1 they do not exceed the boundary dimensions of a typical flotation cell 1. This enables even a plurality of flotation cells 1 to be placed on top of one another such that the need for space in the vertical direction does not increase unreasonably. The injector 2 is highly functional also in terms of flow technology since owing to the axially symmetric shape of the injector, the flow of the fibre suspension to the flow distribution element 6 and further to the mixing apparatus 9 is made particularly uniform and controlled. Furthermore, the fact that the tube sections 10 of the mixing apparatus 9 are placed on the outer circumference of the injector 2 enables the air input of the injector 2 to be arranged in the immediate vicinity of the tube sections 10. Further, the aforementioned cover 15 for closing the upper part of the injector 2 may be located, as schematically shown in FIG. 1, on the roof of the flotation cell 1 so as to enable the flow distribution element 6 and the mixing apparatus 9 to be easily cleaned and serviced by detaching the cover 15 from the injector 2.

In the embodiment shown in FIGS. 2 to 4, the flow distribution element 6 has an annular shape such that it may be placed around the feed channel 3 to surround the feed channel 3 at the lower part of the flow distribution chamber 7. The flow distribution element 6 is thus an annular aperture plate and the apertures 8 therein, annularly arranged, distribute the fibre suspension flow fed to the injector 2 into partial flows. The flow distribution element 6 could also be e.g. an annular nozzle plate which, in the flow direction of the fibre suspension downstream of the aperture plate, is provided with special nozzles in the aperture plate at the apertures 8 thereof, the special nozzles enabling e.g. the shape of the cross section of a jet of the partial flows of the fibre suspension flows exiting the nozzles and/or rate thereof to be influenced. By influencing the shape and/or rate of the jet of the partial flows of the fibre suspension flow it is possible to influence e.g. the amount of air to be carried to the flotation cell 1 by the fibre suspension flow since e.g. the shape of the cross section of the jet of a partial flow may be used for influencing the size of the surface area over which the surface of the jet of the partial flow is in contact with the surrounding air when the particular partial flow flows from the flow distribution element 6 to the mixing apparatus 9.

In the embodiment shown in FIGS. 2 to 4, the upper end of the mixing apparatus 9, i.e. the end directed towards the flow distribution element 6, is made bevelled such that over the middle part of the mixing apparatus 9, i.e. around the feed channel 3, the inner circumference of the mixing apparatus 9 is closer to the flow distribution element 6 than the outer circumference of the mixing apparatus 9. In the case shown in FIGS. 2 to 5, the end of the mixing apparatus 9 directed towards the flow distribution element 6 actually comes into contact with the lower surface of the flow distribution element 6, but could also reside at a distance therefrom. The bevelled end of the mixing apparatus 9 directed towards the flow distribution element 6 easily enables an air input point 11 to be provided between the flow distribution element 6 and the mixing apparatus 9, wherefrom pulp jets of the partial flows of the fibre suspension flowing through the apertures 8 of the flow distribution element 6 suck air and carry it therewith as they travel to the mixing apparatus 9. In the embodiment shown in FIGS. 2 to 4, the air input point 11 is actually formed as a slot extending around the entire outer circumference of the injector 2. It would also be possible to use as the air input point 11 one or more apertures or other openings located at a similar point in a sheath of the injector 2 if a specific sheath structure were provided at the particular point of the injector 2. If the aforementioned nozzle plate is used as the flow distribution element 6, air intake into the mixing apparatus 9 may also be arranged by making the diameter of the tube sections 10 of the mixing apparatus 9 larger than the outer diameter of the nozzles of the nozzle plate, enabling the upper ends of the tube sections 10 to be even partly arranged around the nozzles. The end of the mixing apparatus 9 directed towards the flow distribution element 6 may thus, unlike in the figures, also be straight and the mixing apparatus 9 may, depending on the manner of implementation of the air input points 11, either come into contact with the lower surface of the flow distribution element 6 or reside at a distance therefrom.

Figure 5:
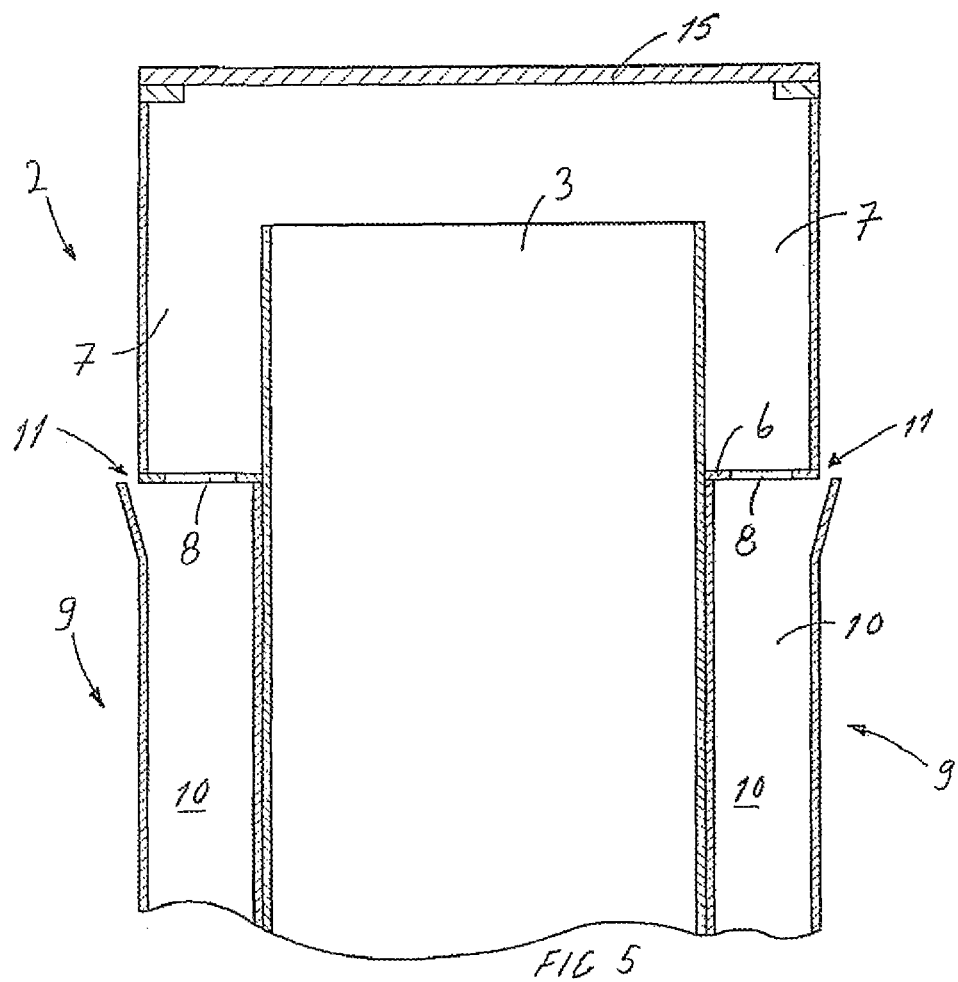
FIG. 5 is a schematic, cross-sectional side view of an upper end of a second injector.

FIG. 5 is a schematic, cross-sectional side view of an injector 2 wherein air input into the injector 2 is implemented such that the outer diameter of the upper part of the mixing apparatus 9 is made larger than the outer diameter of the lower part of the flow distribution element 6 so that the outer circumference of the mixing apparatus 9 is provided with a slot-like air input point 11 which enables air to flow into the mixing apparatus 9. The outer diameter of the mixing apparatus 9 may be tapering, as shown in FIG. 5, allowing air to flow freely into the mixing apparatus 9 and be efficiently mixed with the fibre suspension. The mixing apparatus 9 is functional even if the outer diameter is not tapering, in which case at its simplest the outer diameter is constant over its entire length. These solutions may also be applied to structures other than those having a circular cross section. In such a case, the solution can be described such that the cross-sectional area of the upper part of the mixing apparatus 9 is larger than the cross-sectional area of the lower part of the flow distribution element 6. Of course, this definition may also be used for describing a structure with a circular cross section.

In a manner similar to that used for annularly arranging the apertures 8 in the flow distribution element 6, also the tube sections 10 of the mixing apparatus 9 are annularly arranged around the feed channel 3 at the apertures 8 provided in the flow distribution element 6. The tube sections 10 of the mixing apparatus 9 shown in FIGS. 3 and 4 have circular cross sections but, of course, they might also have polygonal or elliptical cross sections.

In the embodiment shown in FIGS. 2 to 5, the mixing apparatus 9 thus consists of tube sections 10 which are separated from one another by partitions and in which each partial flow of the fibre suspension flow travels separated from other partial flows. In FIGS. 2 to 5, the tube sections 10 and the partitions thereof constitute one uniform piece whose outer circumference forms the outer circumference of the injector 2 over the mixing apparatus portion. The tube sections 10 of the mixing apparatus 9 may also be made from separate tubes that are supported by a support structure against a sheath structure constituting the outer circumference of the injector 2. The mixing apparatus 9 could also consist of one uniform space which has an annular cross section and which is arranged around the feed channel 3 and in which the partial flows of the fibre suspension flow would start mixing together already immediately upon entering the mixing apparatus 9. Further, in the embodiment shown in FIGS. 2 to 5, the feed channel 3 consists of an originally separate tube structure but the c1feed channel 3 may also be provided in the middle of the injector 2 such that the inner circumferences of the flow distribution chamber 7, the flow distribution element 6 and the mixing apparatus 9 constitute the walls of a tubular space corresponding the feed channel 3.

Figure 6:
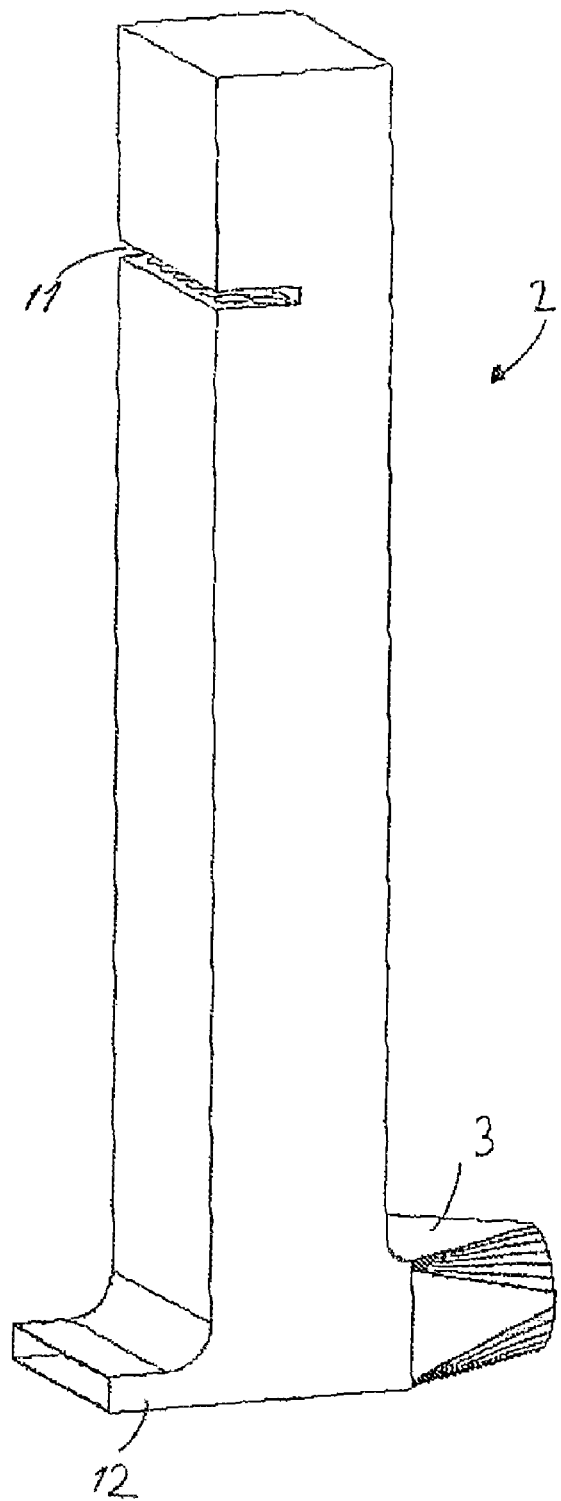
FIG. 6 is a schematic, perspective side view of a third injector.

FIGS. 6 to 8 show a third injector 2. The injector 2 according to FIGS. 6 to 8 comprises a feed channel 3 provided with a first end 3a via which, i.e. from downstream of the injector 2, a fibre suspension flow is fed to the injector 2 as indicated by arrows A. At the upper end of the feed channel 3, the flow direction of the fibre suspension flow turns 180 degrees as the fibre suspension flows from the feed channel 3 via its second end 3b to the flow distribution chamber 7. The flow distribution element 6 provided at the bottom of the flow distribution chamber 7 distributes the fibre suspension flow into partial flows and, subsequently, the partial flows pass via a slot serving as an air input point 11 to the mixing apparatus 9.

As disclosed in FIGS. 6 to 8, the injector 2 according to FIGS. 6 to 8 has a rectangular cross section in the vertical direction and its interior space is divided by a partition structure 16 such that as seen in FIGS. 7 and 8, a feed channel 3 which has a rectangular cross section is formed on the right side of the injector 2 while the left side thereof is provided with a flow distribution chamber 7, a flow distribution element 6 and a mixing apparatus 9 which have a rectangular cross section. The flow distribution element 6 and the mixing apparatus 9 thus reside immediately next to the feed channel 3. In other words, the flow distribution chamber 7, the flow distribution element 6 and the mixing apparatus 9 surround the feed channel 3 at its one edge. The bottom of the mixing apparatus 9 is provided with a diffuser 12 which guides the fibre suspension to the left as seen in FIGS. 7 and 8. The structure and operational principle of the injector 2 according to FIGS. 6 to 8 is thus exactly the same as those of the injectors shown in FIGS. 2 to 5.

The flow distribution chamber 7 may also be a flow distribution channel. For instance, the solution for the upper end of FIG. 7 may consist of a U-shaped flow channel. Neither does the partition 16 have to extend as high as shown in the figures. Hence, no partition 16 is necessarily provided between the second end 3b of the feed channel 3 and the flow distribution chamber 7 at all.

In the injector 2 according to FIGS. 6 to 8, the flow distribution element 6 is an aperture plate but it could also be a nozzle plate set forth in connection with the description of FIGS. 2 to 5. Further, the air input point of the injector 2 according to FIGS. 6 to 8 is, as seen from the side, a rectangular slot, but the air input in the injector 2 according to FIGS. 6 to 8 may be arranged in accordance with all the manners or principles described in connection with FIGS. 2 to 5. Further, in the injector 2 according to FIGS. 6 to 8, the mixing apparatus 9 consists of one uniform space but the mixing apparatus 9 could also comprise specific tube sections in a manner similar to that shown in FIGS. 2 to 5.

In some cases the features disclosed in the present application may be used as such, irrespective of other features. On the other hand, when necessary, the features set forth in the present application may be combined so as to provide different combinations.

In the solution shown by the figures, the cross sectional surface of the feed channel 3 is thus circular or rectangular, but it could also be elliptic or square or have the shape e.g. of another equilateral polygon other than a square and a rectangle. Similarly, in addition to being e.g. circular or rectangular, the entire cross section of the injector may also be elliptic or square or have the shape e.g. of another equilateral polygon other than a square and a rectangle. In the figures, the injector 2 is in an upright position but, when necessary, the injector 2 may also be placed in the flotation cell horizontally or obliquely, between a vertical and a horizontal position.

The drawings and the related description are only intended to illustrate the idea of the invention. In its details the invention may vary within the scope of the claims. The disclosed structure may also be described such that a double-layer injector 2 surrounded by a common sheath is now provided such that a portion of the feed channel 3 belonging to the injector 2 constitutes one layer of the injector 2 while the flow distribution chamber 7, the flow distribution element 6, the air input point 11 and the mixing apparatus 9 constitute the other layer.

The invention claimed is:

1. An injector for a flotation cell, comprising a feed channel for feeding a fiber suspension flow to the flotation cell, a flow distribution element for distributing the fiber suspension flow fed to the injector into partial flows, a mixing apparatus for mixing air with a fiber suspension flow, and at least one air input point for sucking air to be mixed with the fiber suspension flow into the injector, wherein the feed channel, the flow distribution element and the mixing apparatus are in the injector arranged with respect to one another such that a flow direction of the fiber suspension flow in the feed channel is substantially opposite to a flow direction of the fiber suspension flow through the flow distribution element and the mixing apparatus, and wherein the flow distribution element and the mixing apparatus are arranged adjacent to and substantially directly abutting the feed channel so as to at least partially surround the feed channel.

2. An injector as claimed in claim 1, wherein the feed channel has a first end and a second end, and that in connection with the second end of the feed channel a flow distribution chamber is arranged and provided with the flow distribution element for distributing the fiber suspension flow fed to the flow distribution chamber into partial flows, and that the fiber suspension flow is arranged to be fed to the injector via the first end of the feed channel, and that the fiber suspension flow is arranged to flow from the feed channel to the flow distribution chamber via the second end of the feed channel such that when the fiber suspension flow flows from the feed channel to the flow distribution chamber, the flow direction of the fiber suspension flow is arranged to turn 180 degrees.

3. An injector as claimed in claim 1, wherein the feed channel has a first end and a second end, the second end has a flow distribution chamber arranged in connection therewith, and a bottom of the flow distribution chamber is provided with the flow distribution element, and that the flow distribution chamber is arranged around the feed channel to contribute to surrounding the feed channel, and that the fiber suspension flow is arranged to be fed to the injector via the first end of the feed channel, and that the fiber suspension flow is arranged to flow from the feed channel to the flow distribution chamber via the second end of the feed channel such that when the fiber suspension flow flows from the feed channel to the flow distribution chamber, the flow direction of the fiber suspension flow is arranged to turn 180 degrees.

4. An injector as claimed in claim 3, wherein the feed channel, the flow distribution chamber, the flow distribution element and the mixing apparatus share a common central axis.

5. An injector as claimed in claim 1, wherein the feed channel has a first end and a second end, the second end has a flow distribution chamber arranged in connection therewith, and a bottom of the flow distribution chamber is provided with the flow distribution element, and that the flow distribution chamber is arranged next to the feed channel to contribute to surrounding the feed channel about at least at one edge of the feed channel, and that the fiber suspension flow is arranged to be fed to the injector via the first end of the feed channel, and that the fiber suspension flow is arranged to flow from the feed channel to the flow distribution chamber via the second end of the feed channel such that when the fiber suspension flow flows from the feed channel to the flow distribution chamber, the flow direction of the fiber suspension flow is arranged to turn 180 degrees.

6. An injector as claimed in claim 1, wherein the at least one air input point is a slot provided between the flow distribution element and the mixing apparatus.

7. An injector as claimed in claim 1, wherein the flow distribution element is an aperture plate provided with apertures arranged to distribute the fiber suspension flow to be fed to the injector into partial flows.

8. An injector as claimed in claim 1, wherein an end of the injector about an end of the feed channel is closed by a cover configured to be openable for cleaning and servicing the feed channel, a flow distribution chamber, the flow distribution element, and the mixing apparatus.

9. A flotation cell for removing ink or impurities from a fiber suspension, wherein the flotation cell comprises at least one injector according to claim 1.

10. A method of feeding a fiber suspension flow to a flotation cell comprising an injector provided with a feed channel for feeding the fiber suspension flow to the flotation cell, a flow distribution element for distributing the fiber suspension flow fed to the injector into partial flows, a mixing apparatus for mixing air with the fiber suspension flow, and at least one air input point for sucking air to be mixed with the fiber suspension flow into the injector, the method comprising feeding the fiber suspension flow to the injector, distributing the fiber suspension flow to be fed to the injector into partial flows so that the partial flows suck air to be mixed with the fiber suspension flow into the injector, feeding the partial flows of the fiber suspension flow to a mixing apparatus having a pre-mixing phase, whereby the partial flows carry the air sucked into the injector by the partial flows to the pre-mixing phase, and mixing in the pre-mixing phase the air carried by the partial flows to the pre-mixing phase with the partial flows, wherein the feed channel, the flow distribution element and the mixing apparatus are arranged with respect to one another in the injector such that when the fiber suspension flow is fed to the injector, the fiber suspension flow flows in the feed channel in a direction substantially opposite to a flow direction of the fiber suspension flow through the flow distribution element and the mixing apparatus, and wherein the flow distribution element and the mixing apparatus are arranged adjacent to and substantially directly abutting the feed channel so as to at least partially surround the feed channel.

11. A method as claimed in claim 10, wherein the feed channel has a first end and a second end, and in connection with the second end of the feed channel a flow distribution chamber is arranged and includes a flow distribution element for distributing the fiber suspension flow fed to the flow distribution chamber into partial flows, wherein the fiber suspension flow is fed to the injector via the first end of the feed channel, and wherein the fiber suspension flow is fed from the feed channel to the flow distribution chamber via the second end of the feed channel such that when the fiber suspension flow is fed from the feed channel to the flow distribution chamber, the flow direction of the fiber suspension flow turns 180 degrees.

12. An injector as claimed in claim 1, wherein of the flow distribution element and the mixing apparatus substantially surround the feed channel about at least one edge of the feed channel.

* * * * *

UNITED STATES PATENT AND TRADEMARK OFFICE
CERTIFICATE OF CORRECTION

PATENT NO. : 8,177,071 B2  
APPLICATION NO. : 12/594036  
DATED : May 15, 2012  
INVENTOR(S) : Nieminen Page 1 of 1

It is certified that error appears in the above-identified patent and that said Letters Patent is hereby corrected as shown below:

Column 7
Line 40, "c1feed" should read --feed--

Column 10
Line 50, "wherein of the flow" should read --wherein at least one of the flow--

Signed and Sealed this
Twentieth Day of November, 2012

David J. Kappos
*Director of the United States Patent and Trademark Office*